Nov. 11, 1941.    M. L. NOVACK    2,262,513
COMPOSITE FINGER RING
Filed March 20, 1941

Inventor
Maurice L. Novack
By his Attorneys
Merchant & Merchant

Patented Nov. 11, 1941

2,262,513

UNITED STATES PATENT OFFICE 2,262,513

COMPOSITE FINGER RING

Maurice L. Novack, Minneapolis, Minn.

Application March 20, 1941, Serial No. 384,298

2 Claims. (Cl. 63—15)

My invention provides an improvement in finger rings that are made up of a multiplicity of sections and which are properly classified or designated as multi-section or composite rings.

The improved ring structure involves a segmental holding and spacing rack which is adapted to hold and space a plurality of rings such as a wedding ring and an engagement ring when the several elements are applied on a finger. The rack, as preferably designed, involves a complete or nearly complete ring with the rack having a stall or compartment located one on each side of the shank and into which compartments an engagement and a wedding ring may be inserted and held in close assembly when the composite ring is applied on a finger. As is well known, the wedding ring is usually a single band, while the engagement ring has a crown and a gem set therein.

Several forms of the improved composite ring are illustrated in the accompanying drawing wherein like characters indicate like parts throughout the several views.

Referring to the drawing.

Figure 1:
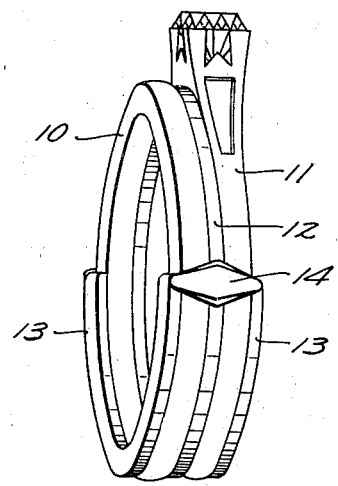
Fig. 1 is a view in perspective showing the composite ring made up of the rack with its band or ring usually designated as a shank, and an engagement ring and a wedding ring assembled therewith.
Figure 2:
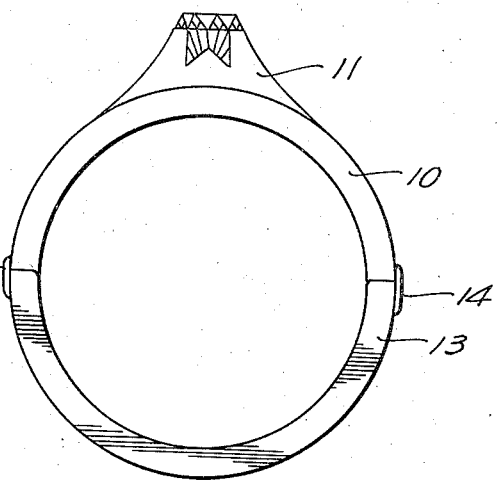
Fig. 2 is a side or face elevation of the composite ring shown in Fig. 1.
Figure 3:
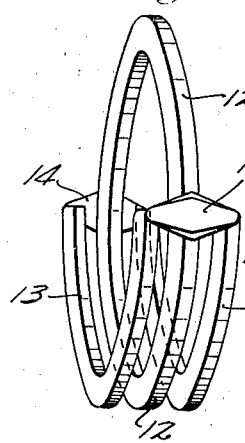
Fig. 3 is a view in perspective showing the holding ring and rack of the structure illustrated in Figs. 1 and 2 with the engagement ring and wedding ring removed therefrom.
Figure 6:
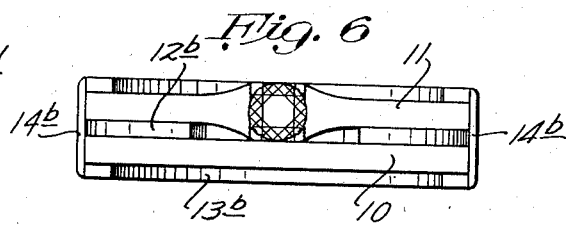
Fig. 6 is a plan view showing a composite ring employing the holding ring and rack structure of Fig. 5 with the engagement ring and wedding ring applied thereto.

In Figs. 1, 2 and 6 the wedding ring is indicated by the numeral 10 and the engagement ring by the numeral 11. The holding ring of the structure illustrated in Figs. 1, 2 and 3, is indicated by the numeral 12 and is equipped with the holding rack which, in the preferred structure, is made up of a pair of ring segments 13, the ends of which are rigidly secured to the ring 12 by cross bars or links 14 soldered, welded or otherwise rigidly secured to the said elements 12 and 13. The segmental bars 13 may be very narrow and light and they are spaced from the ring 12 just enough to afford space to receive one, the engagement ring, and the other, the wedding ring. Otherwise stated, the bars are so applied that they form sort of stalls to receive the engagement and wedding rings and keep the same laterally assembled in compact arrangement.

When these three rings are thus assembled and applied to the finger it, of course, follows that the three elements will, by the finger, be held against edgewise displacement, while they will be held against lateral displacement by the rack. In the drawing, the thickness or width of the rack segments 13 have been greatly exaggerated for the sake of clearness and, in fact, the size of the ring elements are all greatly enlarged for the same reason.

The rack and its holding shank or band are capable of considerable modification. The rack should not extend through more than 180° and may have considerably less circumferential extent. Preferably, however, the best structure in most instances will be that shown in Figs. 1, 2 and 3. Obviously, the arrangement and extent of the rack should be such that the ring elements can be assembled by edgewise movements in planes parallel to the holding ring or shank 12.

Figures 4, 5:
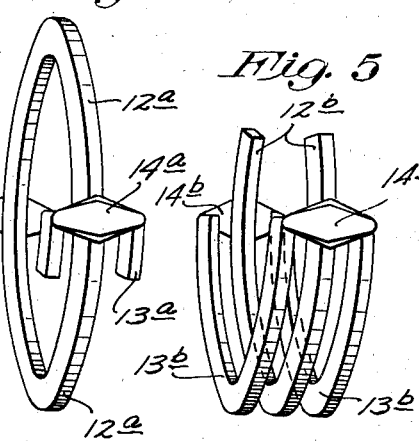
Fig. 4 is a view in perspective corresponding to Fig. 3, but illustrating a structure in which a considerable part of the lower portion of the rack is omitted.
Fig. 5 is a view corresponding to Fig. 3, but showing a modified form of the holding ring and rack in which a portion of the upper part of the annular shank of the rack member is omitted.

In the modified structure illustrated in Fig. 4, the holding ring 12a is provided with short ring segments 13a secured thereto by links or bars 14a. Even these short segmental bars 13a will serve to space the several ring elements.

In the structures illustrated in Figs. 5 and 6, the holding ring 12b is cut away or omitted at its upper portion so that the ends of the said shank 12b will fall short of the enlarged crown portion of the wedding ring 10, as indicated in Fig. 6. In this structure, Figs. 5 and 6, the stall-forming segments 13b are tied to the abridged ring or shank 12b by links or tie-clips 14b.

Figure 7:
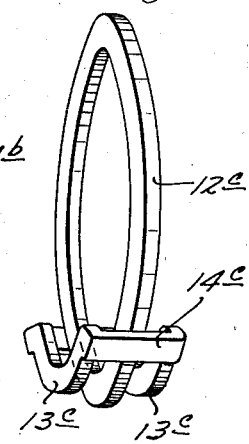
Fig. 7 is a view corresponding to Fig. 3, but illustrating another modification of the segmental holding rack.

In the further modified structure illustrated in Fig. 7, the holding shank 12c is a complete ring and the rack is formed by very short laterally spaced segments 13c secured thereto by links or cross clips 14c.

Figure 8:
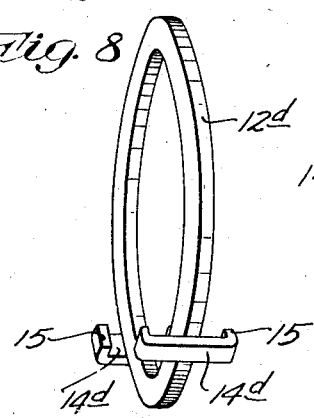
Fig. 8 is a view in perspective illustrating still another modified form of the holding rack.

In the still further modified structure illustrated in Fig. 8, the holding shank 12d is a complete ring or band and the rack is formed simply by cross bars 14d having inturned ends 15.

The manner in which the rack-equipped main ring or shank can be used to hold a plurality of rings, such as an engagement ring and a wedding ring, properly separated and against sliding separating movements on the finger, is quite obvious. In practice, the rack is made of thin and very light material so that it will not render the composite ring cumbersome, but of course, the holding ring or band can be made very thin so that the composite ring will not be made objectionably wide.

Several modifications of the device have been illustrated but it will, of course, be understood that other modifications may be made in the construction or arrangement of the parts within the scope of the invention herein disclosed and claimed.

What I claim is:

1. A primary finger ring member provided at one side with a laterally offset rigidly and permanently secured stall-forming segment, located in the lower half-circumference of said primary ring member and adapted to detachably hold a secondary ring with its upper half portion exposed, said segment at its ends being connected to said primary ring by cross bars that space said segment laterally away from said primary ring member and leave the bottom of the stall open.

2. A primary finger ring member provided at each side with laterally offset rigidly and permanently secured stall-forming segments, located in the lower-half circumference of said primary ring member and adapted to detachably hold second rings with their upper half portions exposed, said segments at their ends being connected to said primary ring member by cross bars that space said segments laterally away from said primary ring member and leave the bottoms of the stalls open.

MAURICE L. NOVACK.